United States Patent [19]
Dishart et al.

[11] Patent Number: 6,043,782
[45] Date of Patent: *Mar. 28, 2000

[54] ANTENNA CONNECTOR ARRANGEMENT

[75] Inventors: Peter T. Dishart, Pittsburgh, Pa.; David T. Perry, Poseyville, Ind.; Randy R. Kadunce; Robert N. Pinchok, Jr., both of New Kensington, Pa.; Robert T. Shumaker, Jr., Manorville, Pa.

[73] Assignee: PPG Industries Ohio, Inc., Cleveland, Ohio

[*] Notice: This patent issued on a continued prosecution application filed under 37 CFR 1.53(d), and is subject to the twenty year patent term provisions of 35 U.S.C. 154(a)(2).

[21] Appl. No.: 08/573,626

[22] Filed: Dec. 18, 1995

[51] Int. Cl.$^7$ ...................................................... H01Q 1/32
[52] U.S. Cl. ............................................ 343/713; 343/906
[58] Field of Search ................................... 343/713, 715, 343/712, 704, 906; 439/67, 916; H01Q 1/32

[56] References Cited

U.S. PATENT DOCUMENTS

| | | | |
|---|---|---|---|
| 3,549,785 | 12/1970 | Timko et al. | 343/712 |
| 3,579,243 | 5/1971 | Dickason | 343/713 |
| 3,618,102 | 11/1971 | Dickason et al. | 343/703 |
| 3,638,225 | 1/1972 | Zawodniak | 343/713 |
| 3,655,545 | 4/1972 | Gillery et al. | 204/192 |
| 3,766,563 | 10/1973 | Seuer et al. | 343/713 |
| 3,866,232 | 2/1975 | Weigt | 343/713 |
| 3,962,488 | 6/1976 | Gillery | 427/109 |
| 3,987,449 | 10/1976 | DeAngelis et al. | 343/713 |
| 4,086,595 | 4/1978 | Cherento et al. | 343/713 |
| 4,213,828 | 7/1980 | Calderon | 201/39 |
| 4,707,700 | 11/1987 | Nagy | 343/712 |
| 4,721,845 | 1/1988 | Kunert et al. | 219/203 |
| 4,768,037 | 8/1988 | Inaba et al. | 343/713 |
| 4,849,766 | 7/1989 | Inaba et al. | 343/713 |
| 4,898,789 | 2/1990 | Finley | 428/623 |
| 5,005,020 | 4/1991 | Ogawa et al. | 343/713 |
| 5,077,483 | 12/1991 | Cloonan et al. | 359/135 |
| 5,083,135 | 1/1992 | Nagy et al. | 343/713 |
| 5,213,828 | 5/1993 | Winter et al. | 428/46 |
| 5,355,144 | 10/1994 | Walton et al. | 343/713 |
| 5,416,491 | 5/1995 | Nishikawa et al. | 343/713 |
| 5,534,879 | 7/1996 | Braun et al. | 343/906 |
| 5,648,785 | 7/1997 | Nagy et al. | 343/713 |
| 5,670,966 | 9/1997 | Dishart et al | 343/713 |

FOREIGN PATENT DOCUMENTS

| | | |
|---|---|---|
| 2219234 | 10/1973 | Germany . |
| 53-29252 | of 1978 | Japan . |
| 53-44349 | 10/1978 | Japan . |
| 62-61285 | 3/1987 | Japan . |
| 62-53806 | 4/1987 | Japan . |
| 63-155804 | 6/1988 | Japan . |
| 1-36336 | 11/1989 | Japan . |
| 3-10404 | 1/1991 | Japan . |
| 3-49445 | 10/1991 | Japan . |
| 4-7583 | 2/1992 | Japan . |
| 6-45817 | 3/1993 | Japan . |
| 8-242114 | 9/1996 | Japan . |

*Primary Examiner*—Don Wong
*Assistant Examiner*—Tho Phan
*Attorney, Agent, or Firm*—Kenneth J. Stachel; Andrew C. Siminerio

[57] ABSTRACT

The present invention provides a connector assembly for electrically connecting to an electroconductive element having an electroconductive connector with a generally flat pad portion, a terminal portion capable of connecting the assembly to an external device and connecting portion interconnecting the pad and terminal portions, and a preformed plug member sized to a predetermined configuration and overlaying the pad portion such that a major surface of said pad portion is exposed along a first surface of the plug member. The exposed surface may be covered with an adhesive and in one embodiment of the invention, the connecting portion extends through the plug member. The plug member is preferably an electrically nonconductive and moisture impervious material.

31 Claims, 3 Drawing Sheets

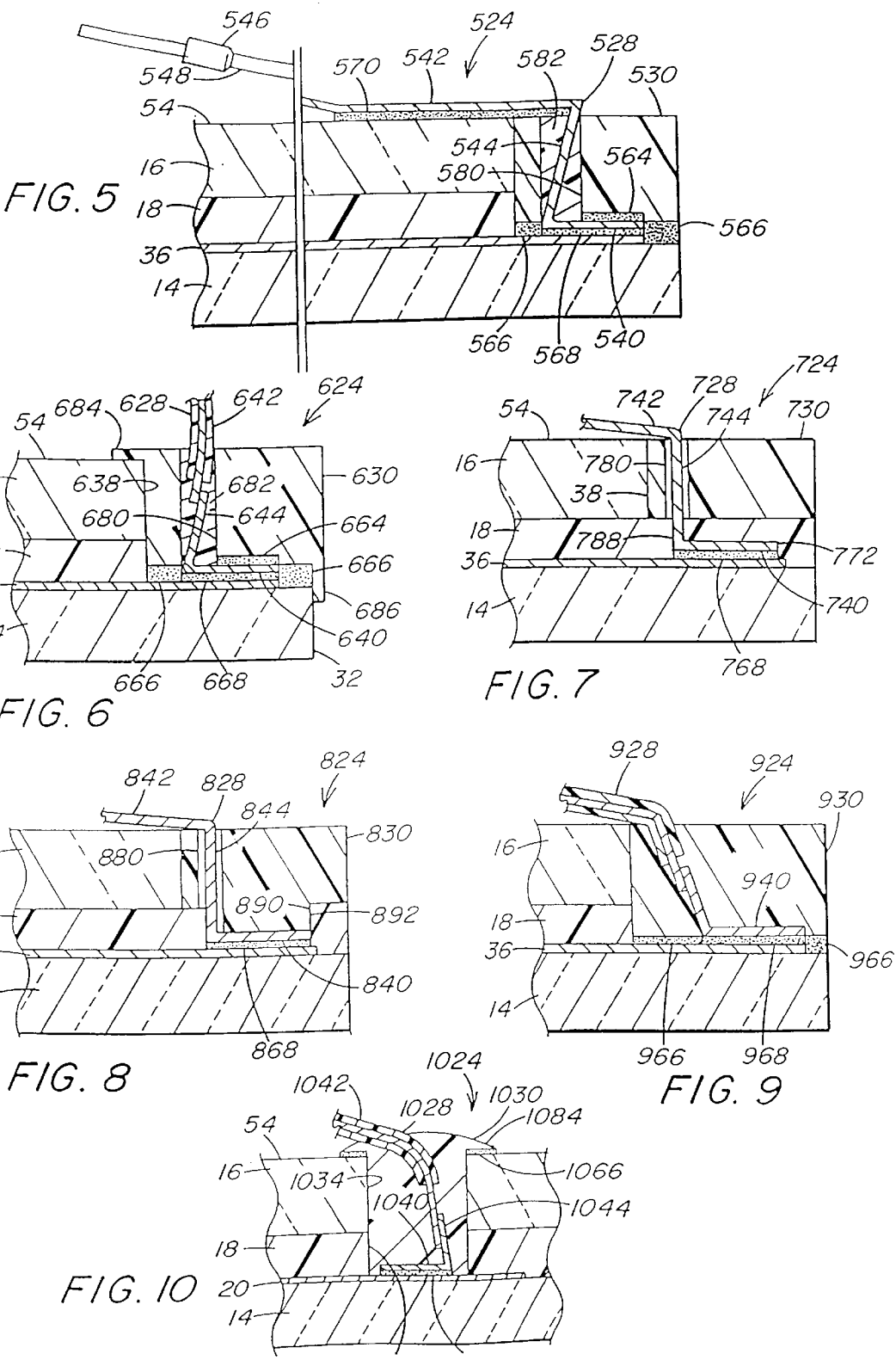

ANTENNA CONNECTOR ARRANGEMENT

BACKGROUND OF THE INVENTION

1. Field of the Invention

The present invention relates to vehicle antennas and in particular to an antenna formed by a transparent coating laminated between two glass plies and an electrical connection arrangement for connecting the antenna to a radio or other transmitting/receiving device.

2. Technical Considerations

In the past, the traditional motor vehicle antenna for receiving and transmitting electromagnetic signals was a mast or whip-type antenna. Recently there has been a trend towards incorporating the antenna into the vehicle structure. For example, U.S. Pat. No. 3,987,449 to DeAngelis et al. discloses a wire antenna laminated within a vehicle windshield. U.S. Pat. No. 4,707,700 to Nagy positions an antenna within the roof structure of a vehicle. U.S. Pat. No. 5,416,491 to Nishikawa et al. forms antenna elements on a window using electroconductive ceramic paints. U.S. Pat. Nos. 4,768,037 and 4,849,766 to Inaba et al. and U.S. Pat. No. 5,355,144 to Walton et al. use a transparent electroconductive coating laminated between two glass plies to form an antenna. U.S. Pat. No. 5,083,135 to Nagy et al. utilizes a transparent coating in the form of a "T" to form an antenna. In each system, the connector arrangement conducts the signals received by the antenna to a receiver, for example a radio.

In order to feed the signals received by the antenna element to an external device, connectors, such as wires, braids or metal tabs, have been used. Problems arise when these elements are laminated within the transparency to make electrical contact with an antenna element. In particular, it has been found that when incorporating these types of connectors between the plies of the laminate, air may be entrapped in the laminate in the vicinity of the connector. It is believed that the connector hinders de-airing of the laminate during a conventional roll prepress operation. The bubbles formed by the entrapped air detract from the aesthetics of the window as well as increase the possibility of windshield delamination at or near the connector. U.S. Pat. No. 5,213,828 to Winter et al. addressed this problem in an electrically heatable windshield where electrical connection was required to be made to electroconductive elements within the windshield. A notch area was formed along the edge of the windshield and silver ceramic enamel leads from the windshield bus bar system were extended to the notch area where wires could then be soldered directly to the leads. However, it was found that during lamination, air would be forced through these porous enamel leads and into the laminate resulting in bubble formation near the notch area. To prevent this, prior to laminating, the ceramic leads were sealed, for example by filling the notch area with sealant. This prevented the bubble formation near the notch area of the laminate.

It would be advantageous to provide an antenna arrangement having a connector assembly that is positioned external to the laminate and electrically interconnects the antenna to an electromagnetic energy transmitting and/or receiving device and seals the connection area while maintaining the aesthetics of the window.

SUMMARY OF THE INVENTION

The present invention provides a connector assembly for electrically connecting to an electroconductive element having an electroconductive connector with a generally flat pad portion, a terminal portion capable of connecting the assembly to an external device and connecting portion interconnecting the pad and terminal portions, and a preformed plug member sized to a predetermined configuration and overlaying the pad portion such that a major surface of said pad portion is exposed along a first surface of the plug member. The exposed surface may be covered with an adhesive and in one embodiment of the invention, the connecting portion extends through the plug member. The plug member is preferably an electrically nonconductive, moisture impervious material.

The present invention also provides a transparent antenna having a first rigid, transparent sheet with an opening extending through the first sheet and a second rigid transparent sheet. An electroconductive antenna element is positioned on the second sheet and the sheets are secured together to form a laminate in a manner such that the antenna element is located between the sheets and a portion of the element extends beneath the opening in the first sheet. A connector assembly is positioned and secured within the opening and includes an electroconductive connector with a first section overlaying the portion of the antenna element beneath the opening, a terminal assembly electrically interconnected to the first section of the connector to allow connection of the electroconductive element to a transmitting and/or receiving device, and a preformed plug member overlaying the first section of the connector and sized to fill at least a substantial portion of the opening. The first and second sheets are preferably glass sheets and the antenna element is preferably a transparent, electroconductive coating. In one particular embodiment of the invention, an adhesive layer is positioned between the first section of the connector to secure the connector assembly within the opening in the first sheet. The opening in the first sheet may be a notch area located along an edge of the first sheet or a hole extending through and spaced from an edge of the first sheet.

The present invention also provides a method of producing a laminated, transparent glass antenna including the steps of cutting a first glass sheet to a desired configuration, providing an opening through the first sheet, cutting a second glass sheet to a configuration generally corresponding to the configuration of the first sheet, applying a transparent electrically conductive coating to a major surface of the second glass sheet, laminating the first sheet to the second sheet such that the coating is positioned between the sheets and a portion of the coating extends beneath the opening in the first sheet, and securing a connector assembly within the opening in the first sheet. The connector assembly includes a preformed plug member which fills at least a substantial portion of the opening in the first sheet and an electroconductive connector with a pad portion that overlays the portion of the coating beneath the opening and a terminal portion extending from the connector assembly to provide connection to an external device. When the connector assembly is secured within the opening, the pad portion of the connector is electrically connected to the coating and the opening is sealed.

BRIEF DESCRIPTION OF THE DRAWINGS

FIGS. 5–10 are cross-sectional views similar to that shown in FIG. 4 of alternate embodiments of the invention.

DETAILED DESCRIPTION OF THE INVENTION

The present invention is disclosed in combination with an antenna system for an electromagnetic energy transmitting and/or receiving device. However, it should be appreciated that the present invention may be used in combination with other types of systems that require electrical connection to conductive elements within a laminate, for example connection to a heating elements within a laminate.

Figure 1:
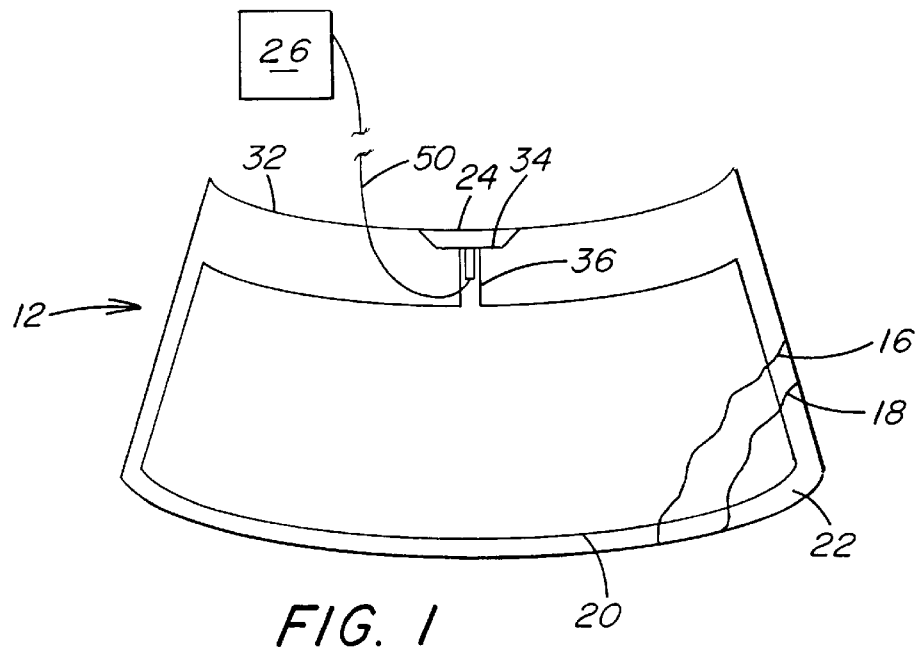
FIG. 1 is a plan view of a transparent glass antenna incorporating features of the present invention.

FIG. 1 illustrates an antenna incorporating the features of the present invention. More specifically, a laminated vehicle windshield 12 is formed by outer and inner glass plies 14 and 16, respectively, which are bonded together by a plastic interlayer 18, preferably polyvinyl butyral. Plies 14 and 16 may be other transparent rigid materials, for example acrylic, polycarbonate, or a combination of different transparent, rigid materials. Windshield 12 further includes at least one antenna element 20. In the particular embodiment of the invention illustrated in FIG. 1, the antenna element 20 is a transparent electroconductive coating applied on surface 22 of glass ply 14 in any manner well known in the art, and generally occupies the central portion of the windshield 12. The coating may be a single or multilayered metal containing coating, for example as disclosed in U.S. Pat. No. 3,655,545 to Gillery et al.; U.S. Pat. No. 3,962,488 to Gillery; and U.S. Pat. No. 4,898,789 to Finley. It should be appreciated that the antenna element 20 may have a configuration different from that shown in FIG. 1. For example, element 20 may be T-shaped as shown in U.S. Pat. No. 5,083,135 or may include multiple antenna elements having various shapes that are either directly or indirectly electrically interconnected.

Although it is preferred that antenna element 20 be a transparent coating, if the antenna element is not positioned in the major vision area of the windshield 12 or does not obstruct the main viewing area of the vehicle transparency, antenna element 20 may be a nontransparent electroconductive material, for example silver-containing ceramic paint, wires, metal foil, etc. In addition, the antenna may include a combination of coating, wire and/or ceramic antenna elements.

With continued reference to FIG. 1, antenna element 20 in this particular configuration is basically quadrilateral in shape and preferably spaced from the peripheral edge of the windshield 12. The exact shape and position of element 20 as well as the addition of any other antenna elements depends in part on the design of the vehicle into which the windshield 12 is installed, the angle of windshield installation, the coating resistivity, the type of signal to be transmitted or received and the desired performance of the antenna. These types of design considerations for a transparent glass antenna are discussed in U.S. Pat. Nos. 4,768,037; 4,849,766 and 5,083,135.

Figure 2:
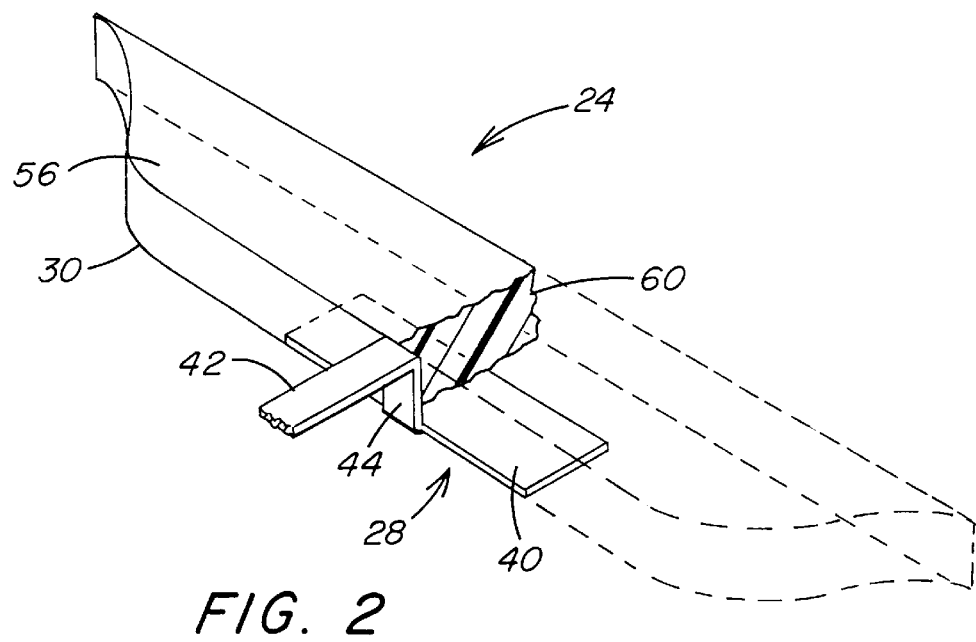
FIG. 2 is a cut-away perspective view of a connector of the present invention, with portions removed for clarity.

A connector assembly 24, which is an object of the present invention, provides a connection between the antenna element 20 and an electromagnetic energy transmitting and/or receiving device 26 (shown only in FIG. 1) and may be fixed to the windshield 12 before or after lamination, as will be discussed later in more detail. Device 26 may be a radio, cellular phone, television, global positioning system or any other type of system that uses antenna element 20 to transmit and/or receive signals. The assembly 24 includes an electroconductive connector 28 and a plug member 30, both of which will be discussed later in more detail. Although not required, in the particular embodiment shown in FIGS. 2–4, the assembly 24 is positioned along the upper edge 32 of the windshield 12. The connection between the assembly 24 and antenna element 20 is configured such that the connector 28 is not laminated between plies 14 and 16. In this manner, the problem of entrapped air resulting from a connector being laminated within the windshield is eliminated. More specifically, a notch area 34 is cut out of the inner ply 16 along the upper edge 32 of the windshield 12. In the particular embodiment of the invention illustrated in FIGS. 3 and 4, a corresponding section of the interlayer 18 is removed from the notch area 34. Connector 28 is secured to a portion of the antenna element 20 that extends into the notch area 34. In an embodiment of the antenna where the notch area 34 is of sufficient depth and antenna element 20 extends close to the edge 32 of the windshield 12, a portion of antenna element 20 may pass through the notch area 34, allowing the connector 28 to be secured directly to element 20. In order to reduce the size of the plug 30 needed to fill the notch area 34 and maintain structural integrity of the windshield 12, it may be preferred to keep the size of the notch area 34 to a minimum. In addition, in order to produce optimal antenna performance, the particular antenna element pattern may require that the coating forming the antenna element 20 be spaced several inches from the edge 32 of the windshield 12. In such a situation, the antenna element 20 may include an extension 36 which extends the antenna element 20 into the notch area 34 and provides an arrangement whereby the connector 28 of assembly 24 may be electrically coupled to the antenna element 20 at the notch area 34. Although not required, the extension 36 may be made of the same material as element 20. In embodiments of the invention where the connector assembly 24 is positioned within the notch area 34 and secured to the windshield 12 after lamination of the windshield 12, it is believed that the problem of air being forced into the windshield 12 through antenna element 20 or extension 36 will be eliminated since the combination of the coating composition and thickness will result in an interface along edge 38 of the notch area 34 through which air cannot pass during a lamination process. In any event, within notch area 34, the element 20 or extension 36 should not extend to the edge 32 of the windshield 12 but rather terminate at least 1 mm from the edge 32. This will ensure that the coating is completely sealed within the notch area 34 by connector assembly 24, as will be discussed later, and will inhibit coating degradation along edge 32.

Figure 3:
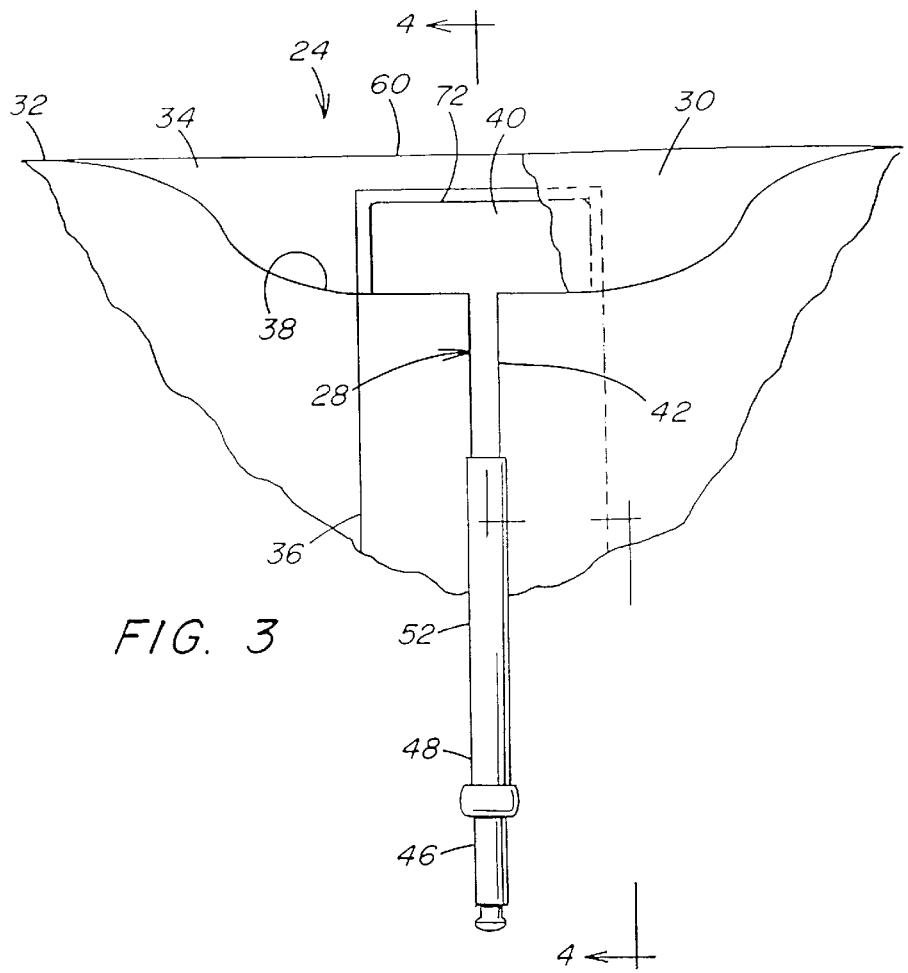
FIG. 3 is an enlarged plan view of the connector of the present invention illustrated in FIGS. 1 and 2, with portions removed for clarity.
Figure 4:
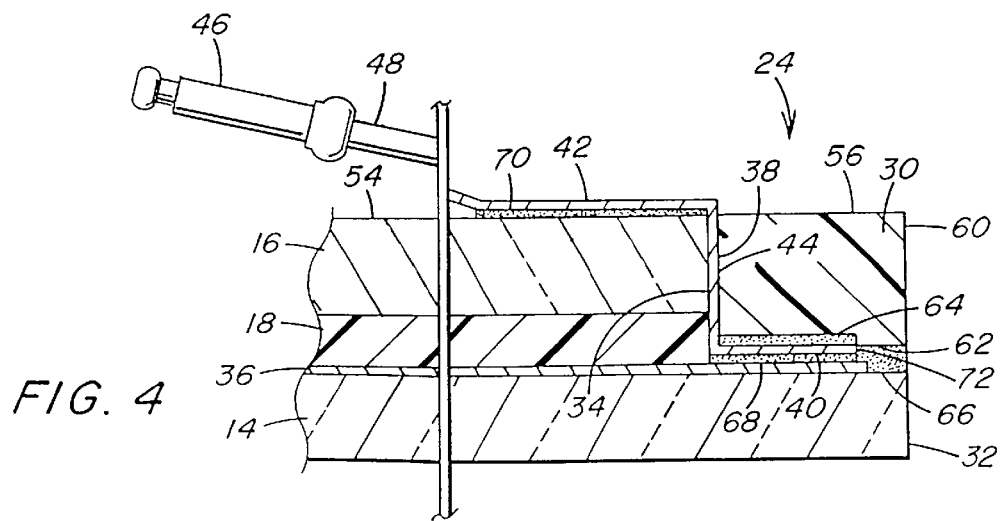
FIG. 4 is a view taken along line 4—4 of FIG. 3.

Connector 28 of assembly 24 is preferably fabricated from stainless steel, copper, tin, brass or any other electroconductive material. If required, combinations of materials, such as stainless steel or brass coated with copper, tin or silver, may be used to enhance conductivity, strength and chemical durability. In the particular embodiment illustrated in FIGS. 2–4, connector 28 includes a pad section 40 which overlays and is in electrical contact with a portion of extension 36 of antenna element 20, a terminal section 42, and a connecting section 44 which interconnects sections 40 and 42. In this embodiment, sections 40, 42 and 44 are formed by a continuous flat metal member so that they are integral with each other. The electrical contact made by section 40 with extension 36 may be a direct connection or a capacitive connection, as will be discussed later in more detail. Terminal section 42 includes an assembly for connecting the antenna element 20 to the transmitting/receiving device 26. In particular, a terminal assembly 46, for example, a male JASO pin as shown in FIG. 3, a reinforced spade assembly, or other electrical connecting device well known in the art, is connected to end 48 of section 42 so that a coaxial cable 50 from device 26 may be easily secured to connector 28. All or selected portions of section 42 may be covered with an electrically nonconductive shrink-wrap 52 as shown in FIG. 4 to prevent the connector 28 from contacting the vehicle in which windshield 12 is installed and adversely affecting the performance of the antenna. If desired, the terminal assembly 46 may be reinforced or enlarged to make it easier to and connect to cable 50. Terminal section 42 of connector 28 extends from plug 30 and in the embodiment illustrated in FIG. 4, at least a portion of terminal section 42 extends along surface 54 of inner ply 16 and is substantially parallel to the pad section 40. Section 44 extends generally perpendicularly between sections 40 and 42 along edge 38 of notch area 34 as shown in FIG. 4. As an alternative, section 44 may be slanted between these sections and inclined relative to edge 38 of notch area 34, as will be discussed later.

In determining the dimensions of connector 28, its surface and cross-section areas must be sufficient to provide the required electrical connectivity between the antenna element 20 and the transmitting/receiving device 26. More particularly, if the surface area of section 40 of connector 28 is too small, especially in the case of a capacitive connection, or the cross-sectional areas of the remaining sections it too low, there may be a signal loss resulting from the restricted current flow from the antenna element 20 through the connector 28 to the transmitting/receiving device 26 which could adversely affect the performance of the antenna.

Plug 30 is configured to fit within and fill at least a substantial portion of the notch area 34, and preferably the entire notch area 34. In the particular embodiment illustrated in FIGS. 2–4, surface 56 of plug 30 is flush with surface 54 of ply 16 and edge 60 is flush with edge 32 of the windshield 12. If desired, the lower surface 62 of the plug 30 may include a relief area (not shown) to receive pad section 40 of connector 28 so that the bottom of the assembly 24 presents a flat surface. Plug 30 is preferably fabricated from an electrically nonconductive, moisture impervious material that is dimensionally and structurally stable over a wide temperature range. In particular, in instances where the connector assembly 24 is applied after lamination of the windshield 12, it is preferred that the plug 30 be able to withstand a temperature of at least 212° F. (100° C.) so that it may maintain its integrity during testing, as will be discussed later. In instances where the connector assembly 24 is applied prior to lamination, the plug 30 must be able to withstand a laminating temperature of about 300° F. (149° C.). An adhesive is used to secure the connector assembly 24 to the windshield 12 as will be discussed later; however, depending on the sensitivity the plug material has to heat, an adhesive may not be required to secure the plug 30 in place within the notch area 34. In particular, if the assembly 24 is applied laminating operation may be used to soften the plug material, securing the assembly 24 in place and sealing the notch area 34. It should be appreciated that with such an arrangement, the plug material should not give off any toxic fumes or gases during the lamination operation and furthermore, should be able to generally maintain its size and shape when exposed to the high temperatures and pressures typically used during an automotive windshield laminating operation. In any event, the plug material, and any adhesive required to secure the plug in place, should form a barrier preventing moisture from entering the notch area 34. Material that may be used for the plug include, but is not limited to, low density polyethylene, polycarbonate, cast acrylic, acetal resin, acrylonitrile-butadiene-styrene, rubber, hot melt adhesives, silicone and epoxy.

Although not required, an adhesive 64 may used to secure section 40 to a surface 62 of plug 30 and hold the two parts of the connector assembly 24 together until it is secured in position on windshield 12.

Adhesive 66 is used to secure assembly 24 in place in the notch area 34. Adhesive 66, which may be applied within the notch area 34 or directly to the plug 30, is preferably a moisture insensitive, electrically nonconductive material that forms an effective moisture barrier throughout the notch area 34. Although not limited in the present invention, adhesive 66 may be polyvinyl butyral, double faced adhesive tape, cyanoacrylate ester such as Loctite® 404 quick set adhesive available from Loctite Corp., CT, epoxies, such as Plastilok® 421 epoxy available from BF Goodrich, Adhesives Systems Division, Akron, Ohio and Scotch-Weld® DP-110 epoxy available from 3M Industrial Tape and Specialty Division, St. Paul, Minn., both of which are two-part flexible epoxy sealants, and hot-melt adhesives, such as Hysol 7811 adhesive available from Hysol Engineering Adhesives, Seabrook, N.H., which is a polyamide resin adhesive. If desired, these same types of materials may also be used as sealants (not shown) applied about the periphery of the plug 30 to provide the required moisture barrier and further secure assembly 24 in place and fill the notch area 34.

An adhesive 68 (shown only in FIG. 4) may be applied to section 40 to secure the connector 28 to antenna element 20 on outer glass ply 14 as assembly 24 is secured in place. As discussed earlier, the electrical connection between the connector 28 and element 20 may be either a direct connection or a capacitive connection. More particularly, the adhesive 68 may be electrically conductive to provide a direct electrical connection between connector 28 and antenna element 20, or it may be electrically nonconductive so that the electrical connection is capacitive. It has been found that a capacitive connection may be used to produce a capacitive reactance that matches the inductive reactance of the antenna to the coaxial cable 50 (shown only in FIG. 1) used to connect the antenna element 20 to the transmitting/receiving device 26, by minimizing the net reactive component as disclosed in U.S. Pat. No. 5,355,144. The required surface area of the section 40 of the connector 28 is based in part, on the spacing between section 40 and antenna elements 20, i.e. the adhesive thickness, the types of materials used for the antenna element, connector and adhesive, and the desired type of connection, i.e. direct or capacitive. In instances where there is direct electrical connection between connector 28 and element 20, it may be desirable to have the surface area provided by pad section 40 large enough so that in the event the conductive adhesive 68 fails, the connector 28 may still maintain a capacitive connection that permits the continued operation of antenna element 20. If desired, colorants may be present with the adhesive 68 to hide the connector 28 when viewed through the outer surface of the windshield 12.

If desired, an adhesive 70 (shown only in FIG. 4) may be applied to a selected portion of section 42 to secure it to surface 54 of inner ply 16 and hold this portion of the connector 28 in place. By keeping at least a portion of section 42 secured to the windshield 12 surface, it reduces the possibility that the connector 28 will be damaged during handing or installation of the windshield 12. Securing section 42 also reduces the possibility of connector assembly 24 interfering with a windshield adhesive application and mounting system (not shown). As an alternative, the depth of the notch area 34 may be increased to move the connector 28 of assembly 24 further inward from edge 32 of the windshield 12 a sufficient distance such that section 42 is spaced from any adhesive that is subsequently applied about the periphery of the windshield 12 to hold the windshield in place in a vehicle.

As with the plug material, if the connection assembly 24 is secured to the windshield prior to or during a the windshield laminating operation, adhesives 64, 66, 68 and 70 as well as any additional sealant must be able to survive the elevated temperatures and pressures of the laminating cycle and should not give off any toxic fumes or gases.

The flat portions of the connectors are preferably made from tin plated brass or tin plated stainless steel with a base metal thickness ranging from 0.002 to 0.02 in. (0.051 to 0.51 mm), and more preferably ranging from 0.005 to 0.007 in. (0.13 to 0.18 mm). When unplated connectors are used, and in particular, stainless steel connectors, it may be required to buff the lower surface of the pad section with an abrasive prior to applying adhesive 68 to remove any oxide layer and ensure good electrical contact between the connector and antenna element 20 or extension 36. Adhesives 64, 66, 68 and 70 may be a double-face tape, adhesive spray or any other type of adhesive system well known in the art.

It should be appreciated that thicker base metal and/or adhesive may be used for the connector 28. For example, the present invention contemplates using a base metal thickness of up to 0.125 in. (0.32 cm) or greater, to form a rigid connector configuration. However, the use of thinner material reduces material costs, allows the connector 28 to be more easily stamped and formed, provides a more flexible structure that allows the connector to conform to variations in the structure of windshield 12, and provides a more flush surface along the bottom of the plug 30. When using a thicker material, it would be advantageous to provide a recess in surface 64 of plug 30 to receive the pad section 40 as discussed earlier. As discussed earlier, since the connector 28 is being positioned along an edge of the windshield 12, care should be taken to avoid having the connector 28 interfere with the windshield adhesive and mounting system. This potential problem may be minimized by reducing the total combined thickness of section 42 and adhesive 70 or increasing the size of the notch area 34 to move the connector 28 further inward from edge 32. However, if the thickness of this portion of the connector assembly 24 is not a concern, the connector assembly 24 may use a thicker member and/or incorporate the use of wires as disclosed in FIG. 5 and will be discussed later.

The notch area 34 must be large enough to accommodate the connector 28 as well as provide sufficient contact between the plug 30 and outer glass ply 14 to develop a good bond and prevent the assembly 24 from being pulled out of the notch area 34. In addition, there should be sufficient spacing between edge 72 of the connector 28 and edge 32 of the windshield 12 to ensure that the plug 30 completely seals connector 28 within the notch area 34 and provides a continuous moisture barrier along edges 32 and 38. The spacing between edge 72 of connector 28 and edge 32 of the windshield 12 should be at least 1 mm, and preferably at least 3 mm.

In practice it has been observed that when the assembly 24 is applied after lamination, a small amount of interlayer 18 is squeezed into the notch area 34 along edge 38, preventing plug 30 from being placed directly against edge 38. In order to ensure that assembly 24 is properly received within the notch 34, the lower edge of plug 30 may be beveled (not shown) to accommodate the interlayer. As an alternative, the interlayer extending into the notch area 34 after lamination may be removed. When the latter procedure is followed, care must be taken to avoid effecting the antenna element 20 along the edge 38 of notch area 34 in such a way that it becomes electrically isolated from the remaining portion of the antenna element 20. As another alternative, the interlayer 18 within the notch area 34 may be cut prior to assembly of the windshield 12 such that the removed section of interlayer is slightly larger than the notch area 34. In this fashion, as the interlayer is heated and squeezed during lamination, it will not flow into the notch area 34. Furthermore, as shown in FIGS. 7 and 8, the interlayer within the notch area 34 may be used as an adhesive to hold plug 30 in place and seal the connector assembly 24 within the notch area 34, as will be discussed later in more detail.

FIG. 5 illustrates another embodiment of the present invention which includes an assembly 524 with connector 528 and plug 530. Connector 528 includes pad section 540, terminal section 542 and connecting section 544 which are all integral with each other. The terminal assembly 546 is an integral spade connector formed at end 548 of section 542. If desired, the length of section 542 may be shortened as compared to section 42 in connector 24 by replacing a portion of section 542 with an insulated wire (not shown) soldered to the connector 528. A spade connector, JASO pin or other terminal assembly 546 would be connected to the wire for connection device 26 via cable 50. In this particular embodiment, plug 530 is similar to plug 30 discussed earlier except that it includes an opening 580 through which connecting section 544 extends. Connecting section 544 may extend generally perpendicular through plug 530 between pad section 540 and terminal section 542, or as an alternative at least a portion of section 544 may be skewed within plug 530, i.e. slanted relative to sections 540 and 542 and inclined within notch area 34. In the particular configuration illustrated in FIG. 5, section 544 is slanted so that connector 528 forms a "Z" shaped configuration. This type of inclined connector configuration will allow for variations in the combined thickness of the inner glass ply 16 and interlayer 18. Adhesive 568 secures section 540 to the extension 36 and adhesive 566 secures plug 530 in place. In addition, adhesives 564 and 570 may be used as required to secure connector 528 to plug 530 and terminal section 542 to surface 54 of ply 16, respectively. It should be noted that opening 580 in plug 530 must be large enough to that the terminal assembly 546 may pass through it. If desired, opening 580 may be filled with a sealant 582.

It should be appreciated that other connector configurations may be combined with a plug as discussed earlier to allow for variations in glass and interlayer thicknesses as discussed above with respect to connector 528. For example, without limiting the present invention, FIG. 6 illustrates a connector 628 of assembly 624 which includes a pad section 640 which is integral with connecting section 644. Terminal section 642 which is an insulated wire connected at one end to section 644. A terminal assembly (not shown) is secured to the opposite end of the wire. In this particular embodiment, sections 642 and 644 extend through opening 680 in plug 630. Connecting section 644 is skewed relative to section 640 which, in combination with the flexibility of wire terminal section 642, allows for variations in the combined thickness of the inner glass ply 16 and interlayer 18. Adhesive 668 secures section 640 to the extension 36 and adhesive 666 secures plug 630 in place. Adhesive 664 may be used to secure connector 628 to plug 630 and additional adhesives (not shown) may be used to secure section 542 to surface 58 of glass sheet 16. If desired, opening 680 may be filled with a sealant 682. In addition, in this particular embodiment, plug 630 includes a lip 684 that extends along surface 54 of ply 16 beyond edge 638 of the notch area 34 and a lip 686 which extends over ply 14 along edge 32 of windshield 12 to further seal the connector assembly 624. If desired, adhesives or sealant (not shown) may be applied along the lips 684 and/or 686 to provide additional adhesion and moisture protection.

The embodiments of the invention illustrated in FIGS. 4–6 may be applied to the windshield 12 before or after lamination. FIG. 7 illustrates an embodiment of the invention wherein the connector assembly is applied prior to lamination. In particular, in this embodiment interlayer 18 is not removed from the notch area 34 but rather is used as the adhesive to secure connector assembly 724 in place and seal the notch area 34. More specifically, a slit 788 is made through the interlayer 18 within the notch area 34 and sections 742 and 744 and the terminal assembly (not shown in FIG. 7) of connector 728 are threaded through the slit 788. Section 740 is secured to extension 36 on ply 14 with adhesive 768 and plug 730 is positioned within the notch area 34. Plug 730 may include an opening 780 as shown in FIG. 7 through which sections 742 and 744 extend, or it may be solid, similar to plug 30 in FIG. 4. With this later arrangement, section 744 of connector 728 would extend between plug 730 and ply 16 along edge 38. Opening 780 may be filled with a sealant (not shown) to further seal the assembly 724. Additional adhesives or tape (not shown) may be used to hold the plug 730 of assembly 724 in place until the windshield 12 undergoes a laminating operation. The elevated temperature and pressure applied to the windshield 12 during lamination will soften the interlayer 18 within the notch area 34 and secure plug 730 in place. It should be appreciated that the thickness of plug 730 is less than that of plugs 30, 530 and 630 since the interlayer 18 has not been removed from the notch area 34. To simplify assembly so that the connector 728 do not have to be slid under the interlayer 18 and threaded through slit 788, the portion of the interlayer 18 extending into the notch area 34 may be removed prior to assembly of the windshield 12 and an preassembled connector assembly 724 used. More specifically, the connector 728 and plug 730 may be combined with an adhesive layer generally a corresponding to the removed interlayer portion to form the connector assembly 724. With such an arrangement, the adhesive may be used to secure the connector 728 to plug 730 prior to installation of the assembly 724 or the plug 730 and the adhesive may be loosely strung together by the connecting portion 744 of the connector 728 which extends through the adhesive and plug 730. The adhesive used to secure the assembly 724 in place may be the same material as the interlayer 18 or any other type of adhesive.

FIG. 8 illustrates another embodiment which uses the interlayer 18 to secure a connector assembly in place. In particular, a hole 890 is cut in the interlayer 18 in the vicinity of the notch area 34 and plug 830 of assembly 824 is configured with an extended lower portion 892 that fits within the hole 890. Although not required, plug 830 may include an opening 880 through which sections 842 and 844 and a terminal assembly (not shown in FIG. 8) of connector 828 extend. As plug 830 is positioned within notch area 34 and portion 892 is received within opening 890 of the interlayer 18, section 840 of the connector 828 will overlay and be secured to extension 36 using adhesive 868. After placement of plug 830, opening 880 may be filled with a sealant. As discussed earlier in connection with the embodiment of the invention illustrated in FIG. 7, additional adhesive or tape may be used to hold the assembly 824 in place within the notch area 34 until the laminating operation.

As an alternative to fabricating the plugs separate from the connectors and assembling the two components to form the connector assembly, the plug section may be injected molded to the desired shape about the connector to form a one-piece assembly as shown in FIG. 9. The encapsulated connector may be any desired configuration, e.g. a combination flat metal and wire connector 928 as shown in FIG. 9, or a one-piece integral connector as shown in FIGS. 4, 5, 7 and 8. In addition, the connector 928 may extend through the plug 930 as shown in FIG. 9 or along the edge of the plug 930 in a manner similar to that shown in FIG. 4. Adhesive 968 secures connector pad 940 to extension 36 and adhesive 966 secures assembly 924 within the notch area. It should be noted that if the assembly 924 is fixed within the notch area prior to lamination, selecting an encapsulant which will soften and act as an adhesive will eliminate the need for adhesive 966. Although not limiting in the present invention, the encapsulant used to form plug 930 of connector assembly 924 may be a room temperature curable epoxy, e.g. Scotch-Weld® DP-110 epoxy. In a manner similar to that discussed earlier, if the connector assembly 924 is applied prior to lamination of the windshield 12, the encapsulant should not give off any toxic fumes or gases should be able to maintain its size and shape when exposed to the high temperatures and pressures typically used during an automotive windshield laminating operation. Furthermore, the encapsulant and any adhesive required to secure the connector assembly 924 in place, should form a barrier preventing moisture from entering the notch area 34.

FIG. 10 illustrates an embodiment of the invention wherein the connector assembly is positioned within the periphery of the windshield 12 rather than along an edge. More specifically, glass ply 16 includes an opening 1034 which extends through the ply 16 and is aligned with hole 1090 in interlayer 18 to expose antenna element 20 (or extension 36). The material removed from interlayer 18 may be removed before or after the lamination operation depending on when the connector assembly 1024 is secured to the windshield 12. Connector assembly 1024 includes a connector 1028 and plug 1030. Pad section 1040 of connector 1028 overlays antenna element 20, and if required is secured thereto by adhesive 1068. Section 1044 may extend through plug 1030 as shown in FIG. 10 or along the edge of opening 1034, in a manner similar to that shown in FIG. 4. Terminal section 1042 extends from the plug 1030 and provides for connection to a radio or other device. In this particular embodiment of the invention, plug 1030 includes a collar 1084 which extends along surface 54 of ply 16 to seal opening 1034. Adhesive 1066 may be applied to the collar 1084 to secure plug 1030 in place and seal the connector assembly 1024. Additional adhesive (not shown) along the bottom of plug 1030 may be used in place of or in combination with adhesive 1066 to secure assembly 1024 in place.

In one particular embodiment of the invention, the antenna element 20 was a transparent, electroconductive multilayered coating centered on surface 22 of glass ply 14 within the main viewing area of the windshield 12 and having a resistivity of approximately 3 ohms per square. The distance from the edge of the antenna element coating to the edge of the windshield 12 varied, with a minimum spacing between the main portion of the coating forming antenna element 20 and the metal frame (not shown) surrounding the windshield 12 of 0.25 inches (6.4 mm). Antenna element 20 was spaced from edge 32 of windshield 12 and did not pass through the notch area 34. As a result, an extension 36 was used to bridge the space between the antenna element 20 and the notch area 34 as shown in FIGS. 1, 3 and 4. Extension 36 was a coating identical to and applied at the same time as the antenna element 20. Extension 36 was 1.38 in. (35 mm) wide to accommodate the full width of pad section of the connector assembly, which is discussed below. Although not required, it is preferred that the connector assembly be positioned in the central portion of the windshield 12, i.e. within the central third of the windshield 12 and more preferably at the center of windshield 12. The notch area 34 was approximately 0.47 in. (12 mm) deep and 3.93 in. (100 mm) wide.

The connector assembly was of the type illustrated in FIG. 7. More specifically, connector 728 was a stainless steel member approximately 0.002 in. (0.127 mm) thick throughout. Section 740 was approximately 0.39×1.18 in. (10×30 mm) and positioned so that there was at least one millimeter between edge 772 of section 740 and edge 32 of the windshield 12. Sections 742 and 744 were about 0.25 in. (6.4 mm) wide and section 736 was about 5 in. (127 mm) long. The effective height of the connector 724 was about 0.118 in. (3 mm) which was the approximate combined thickness of inner ply 16 and interlayer 18. In this particular embodiment, the terminal assembly included an integral spade connector at the end of section 742. Interlayer 18 extended into the notch area 34 and a slit 788 was cut in the interlayer 18 near edge 38 of the notch area 34. Sections 742 and 744 were threaded through the slit 788 of the interlayer 18 and opening 780 in the plug 730. Section 740 was secured to extension 36 by a double-sided electrically conductive adhesive tape approximately 0.002 in. (0.051 mm) thick, for example Product No. 9703 tape, available from 3M Company, St. Paul, Minn., to make a direct electrical connection. As an alternative, an electrically nonconductive adhesive, for example Product No. 9482, available from 3M Company may be used to secure section 740 to the extension 36 (or element 20) and form a capacitive connection. Plug 730 was made of an ABS (acrylonitrile, butadiene and styrene) thermoplastic material. Opening 780 in the plug 730 was not filled with a sealant.

In this particular embodiment, section 742 of connector 724 was not secured to surface 54 of ply 16; however, a double sided non-conductive tape could have been used to secure section 742 in a desired position if required. In addition, if desired, the periphery of the connector assembly 724 could be sealed with an epoxy, silicone or other sealant material.

It should be appreciated that the size of the notch area 34 and/or connector assemblies of the present invention may be modified to further space the connector from the edge 32 of the windshield 12. However, it should be remembered that the area of the pad section of the connector and the width of extension 36 must be sufficient to provide the desired electrical connection between the connector assembly and antenna while maintaining the desired edge spacing.

In fabricating the windshield 12 described above, the transparent electroconductive coating was applied to glass ply 14 in any manner well known in the art. Ply 14 was masked to provide the desired antenna pattern. As an alternative, the entire surface 22 of ply 14 may be coated and thereafter selected portions of the coating removed to provide the desired antenna pattern. After coating, ply 14 was combined with ply 16 and the two plies were shaped simultaneously using techniques well known in the art, for example gravity sag bending. If desired, plies 14 and 16 may be shaped individually and/or prior to applying the antenna element 20. After shaping, the interlayer 18 was inserted between plies 14 and 16. As discussed earlier, a slit 788 was made through the interlayer 18 within the notch area 34. Sections 742 and 744 and the terminal assembly of connector 728 were threaded through slit 788 and opening 780 in plug 730. Pad section 740 was secured to extension 36 and plug 730 was positioned in the notch area 34 with the assembly being held in place by tape. The entire assembly was then laminated using techniques well known in the art, to form a unitary structure.

A windshield with the connector arrangement discussed above was subjected to accelerated testing to evaluate its performance. In one test, the windshield was placed in boiling water for two hours. The connector assembly passed this test by showing no visible delamination of the windshield or bubbles within the notch area 34 or the area surrounding the notch area 34. Another windshield was subjected to an accelerated high humidity test wherein the windshield was exposed to a constant temperature of about 125° F. (52° C.) and 100% relative humidity for a period of 2 weeks. The connector assembly lost adhesion within the notch area 34 along the glass surface and failed. It is believed that the failure was due to excessive moisture absorption by the interlayer adhesive. As a result, it is believed that sealing the periphery of the connector assembly as discussed earlier or removing the interlayer from within the notch area 34 and replacing it with a moisture insensitive adhesive, e.g. moisture insensitive polyvinyl butyral, will solve this problem.

Although the invention as discussed above included only one electrical connection to the antenna element 20, it should be appreciated that multiple connections to the antenna element 20 may be made along one or several edges of the windshield 12.

As discussed earlier, the electrical connection as taught herein may be applied to the windshield 12 either before or after lamination. When applied before lamination, the heat from the laminating operation may be used to cure the adhesive and sealant. When the connection is made after lamination, the problem of applying the connector to a defective windshield may be avoided.

The invention described and illustrated herein represents a description of illustrative preferred embodiments thereof. It is understood that various changes may be made without departing from the gist of the invention defined by the claims that follow.

We claim:

1. A connector assembly for electrically connecting to an electroconductive element, said assembly comprising:

an electroconductive connector having a generally flat pad portion, a terminal portion capable of connecting said assembly to an external device and connecting portion which extends generally perpendicularly between the pad portion and the terminal portion to electrically interconnect said pad and terminal portions, where the pad, terminal and connecting portions are integral with each other; and a preformed plug member sized to a predetermined configuration and overlaying said pad portion such that a major surface of said pad portion is exposed along a first surface of said plug member and where the plug member associates with the connecting portion of the electroconductive connector for spaced apart relation of the connecting portion from the peripheral edge of the plug that upon installation of the connector assembly is the flush outer edge.

2. The connector assembly as in claim 1 wherein said connector is secured to said plug member.

3. The connector assembly as in claim 2 wherein said connector is encapsulated within said plug member such that said major surface of said pad portion remains exposed.

4. The connector assembly as in claim 1 wherein said plug member is an electrically nonconductive and moisture impervious material.

5. The connector assembly as in claim 4 wherein said plug member is a material selected from the group consisting of low density polyethylene, polycarbonate, cast acrylic, acetal resin, acrylonitrile-butadiene-styrene, rubber, hot melt adhesives, silicone and epoxy.

6. The connector assembly as in claim 1 including an adhesive applied at least along a portion of said first surface of said plug member not overlaying said pad member.

7. The connector assembly as in claim 1 wherein said connecting portion is skewed relative to said pad portion and said terminal portion and said skewed connecting portion extends through said plug member.

8. The connector assembly as in claim 1 further including an adhesive layer positioned between said pad portion and said plug member.

9. The connector assembly as in claim 8 wherein a portion of said connector extends through said adhesive layer and said plug member.

10. The connector assembly as in claim 9 wherein said adhesive layer is polyvinyl butyral.

11. The connector assembly as in claim 1 wherein said pad portion contacts said first surface of said plug member along a portion that is offset from a remaining portion of said first surface.

12. The connector assembly as in claim 1 further including an electrically nonconductive adhesive applied along at least said exposed major surface of said pad portion.

13. A connector assembly for electrically connecting to an electroconductive element, said assembly comprising:
   an electroconductive connector having a generally flat pad portion, a terminal portion capable of connecting said assembly to an external device and connecting portion interconnecting said pad and terminal portions, where the pad, terminal and connecting portions are integral with each other;
   a preformed plug member sized to a predetermined configuration and overlaying said pad portion such that a major surface of said pad portion is exposed along a first surface of said plug member where the plug member is associated with the connecting portion of the electroconductive connector for spaced apart relation of the connecting portion from the peripheral edge of the plug that upon installation of the connector assembly is the flush outer edge; and
   an electroconductive adhesive applied along at least said exposed major surface of said pad portion.

14. A transparent antenna comprising:
   a first rigid, transparent sheet having an opening extending through said first sheet;
   a second rigid transparent sheet secured in overlaying relation to said first sheet to form a laminate, wherein a portion of a major surface of said second sheet is exposed through said opening;
   at least one electroconductive antenna element supported on said second sheet and having a portion extending along said exposed portion of said second sheet; and
   a connector assembly positioned within said opening and having an electroconductive connector having a generally flat pad portion, as a first section of the electroconductive connector overlaying said portion of said electroconductive element, a terminal assembly, and connecting portion which extends generally perpendicularly between the first section and the terminal assembly to electrically interconnect to said first section and terminal assembly to allow connection of said electroconductive element to a transmitting and/or receiving device, where the first section, terminal assembly and connecting portions are integral with each other, and a preformed plug member overlaying said first section of said connector and secured within said opening such that said plug member overlays said exposed portion of said second sheet and fills at least a substantial portion of said opening and where the connecting portion of the electroconductive connector is spaced apart from the peripheral edge of the plug that is flush with an edge of the second rigid transparent sheet.

15. The antenna as in claim 14 wherein said first and second sheets are glass sheets and said antenna element is a transparent, electroconductive coating.

16. The antenna as in claim 14 wherein said first section of said connector is in direct electrical contact with said antenna element portion.

17. The antenna as in claim 14 further including an adhesive layer positioned between said plug member said second sheet to secure said connector assembly within said opening.

18. The antenna as in claim 17 wherein said adhesive layer is polyvinyl butyral.

19. The antenna as in claim 14 wherein said opening is a notch area located along an edge of said first sheet.

20. The antenna as in claim 14 wherein said opening is a hole extending through and spaced from an edge of said first sheet.

21. The antenna as in claim 14 wherein said plug member includes an enlarged section which extends beyond said opening and overlays portions of said laminate immediately adjacent said opening.

22. The antenna as in claim 14 further including sealant applied along selected portion of the periphery of said plug member.

23. The antenna as in claim 14 further including an adhesive layer between said first section of said connector and said plug member.

24. The antenna as in claim 14 wherein the terminal section extends along the outer surface of the first sheet.

25. The antenna as in claim 14 further including an electrically nonconductive shrink-wrap covering at least a portion of the terminal section to prevent the connector from contacting a vehicle in which the transparent antenna is installed to adversely affect the performance of the antenna.

26. A transparent antenna comprising:
   a first rigid, transparent sheet having an opening extending through said first sheet;
   a second rigid transparent sheet secured in overlaying relation to said first sheet to form a laminate, wherein a portion of a major surface of said second sheet is exposed through said opening;
   at least one electroconductive antenna element supported on said second sheet and having a portion along said exposed portion of said second sheet; and
   a connector assembly positioned within said opening and having an electroconductive connector with a first section overlaying said portion of said electroconductive element, a terminal assembly electrically interconnected to said first section through a connecting portion which is integral with the first section and the terminal assembly to allow connection of said electroconductive element to a transmitting and/or receiving device, and a preformed plug member overlaying said first section of said connector and secured within said opening such that said plug member overlays said exposed portion of said second sheet and fills at least a substantial portion of said opening and where the connecting portion of the electroconductive connector is spaced apart from the peripheral edge of the plug that is flush with an edge of the second rigid transparent sheet and wherein said first section of said connector is capacitively connected to said antenna element portion.

27. A method of producing a laminated, transparent glass antenna comprising the steps of:

cutting a first glass sheet to a desired configuration;

cutting a second glass sheet to a configuration generally corresponding to said configuration of said first sheet;

providing an opening through said first sheet;

applying a transparent electrically conductive coating to a major surface of said second glass sheet;

laminating said first sheet to said second sheet such that a portion of said second sheet in the vicinity of said opening is exposed, wherein said coating is positioned between said sheets and a portion of said coating extends along said exposed portion of said second sheet, and securing a connector assembly within said opening in said first sheet, said connector assembly having a preformed plug member which fills at least a substantial portion of said opening and an electroconductive connector with a pad portion overlaying said portion of said coating extending along said exposed portion of said second sheet, a connecting portion which is spaced apart from the peripheral edge of the plug that is flush with an edge of the second glass sheet and where the connecting portion extends generally perpendicularly between the pad portion and a terminal portion extending from said connector assembly to provide connection to an external device, so as to electrically connect said pad portion to said coating portion and seal said opening.

28. The method as in claim 27 wherein said opening is a notch area located along an edge of said first sheet.

29. The method as in claim 27 wherein said opening is spaced from an edge of said first sheet.

30. The method as is claim 27 wherein at least a portion of said securing step occurs during said laminating step.

31. An electrical connector assembly for electrically connecting to an electroconductive element within a laminate comprising:

an electroconductive connector having a pad portion with a generally flat major surface, a terminal portion capable of connecting said assembly to an external device, and a connecting portion which extends generally perpendicularly between the pad portion and the terminal portion to electrically interconnect said pad portion and terminal portion, where the pad, terminal, and connecting portions are integral with each other; and a preformed plug member sized to fill an opening in said laminate and overlay said pad portion such that said major surface of said pad portion is exposed and such that the connecting portion of the electroconductive connector is spaced apart from the peripheral edge of the plug that is flush with an outer edge of the electrical connector assembly upon installation.

\* \* \* \* \*